United States Patent

Gutman et al.

[11] 3,836,273
[45] Sept. 17, 1974

[54] DETACHABLE TELESCOPIC JOINT

[76] Inventors: Anatoly Lvovich Gutman, ulitsa Eniseiskaya, 6, kv. 14; Vladimir Alexandrovich Presman, 2 pereulok Kozlova, 8, kv. 10, both of Minsk; Leonid Mikhailovich Abramov, Chilanzar, kvartal V15, dom 28 "b", kv. 23; Jury Stepanovich Shokurov, Chilanzar, kvartal V21, dom 7, kv. 59, both of Tashkent, all of U.S.S.R.

[22] Filed: Dec. 28, 1973

[21] Appl. No.: 429,370

[52] U.S. Cl. ............... 403/377, 403/383, 285/175
[51] Int. Cl. ............................................ F16b 7/10
[58] Field of Search .......... 403/104, 109, 350, 383, 403/361, 377, 404, 375; 285/175, 176, 399, 423, 328

[56] References Cited
UNITED STATES PATENTS
2,949,692  8/1960  Kuhn .......................... 403/375 X
FOREIGN PATENTS OR APPLICATIONS
1,194,927  5/1959  France ........................... 285/176

Primary Examiner—Andrew V. Kundrat
Attorney, Agent, or Firm—Holman & Stern

[57] ABSTRACT

In the joint, an element made of resilient material has at least three portions gradually converting from one into other, wherein the middle one of them is circular-shaped in its cross-section, while the extreme ones are oval-shaped, and their similar axis are crossing.

1 Claim, 4 Drawing Figures

DETACHABLE TELESCOPIC JOINT

The invention relates to detachable telescopic joints of two cylindrical elements with one of them made of resilient material. Such joints find application in different units of machinery and general engineering.

Widely known are detachable telescopic joints of two elements with one of them made of resilient material, such as thermoplastic polymer. The elements of such joints are made to be cylindrical and smooth and after being assembled leave a small fitting clearance.

To obtain the required fitting dimensions the elements of the joint should be machined at a high accuracy which is difficult to assure due to a high degree of shrinkage of plastics with the resultant variations in the fitting dimensions of elements.

In addition, these known joints are insufficiently reliable, which curbs their more wider application.

Also known are such detachable telescopic joints of cylindrical elements where one of them is made to be split and during assembly is tightened by means of a bolt-clamped yoke.

These joints require much time in handling and are also insufficiently reliable.

The object of the present invention is to provide a telescopic joint to be simple to manufacture and highly reliable in use.

These and other objects are achieved due to the provision of a detachable telescopic joint of two cylindrical elements with one of them made of resilient material, wherein according to the invention the element made of resilient material has at least three portions gradually converting from one into other, whereas the middle one of them is of the circular shape, while the extreme ones are of the oval shape and their similar axes are crossing.

The essence of the present invention is in the following.

Oval-shaped portions of the joint element made of resilient material make it possible due to the elastic deformation of this element to restrict mutual displacement of the elements during assembly and by this to improve reliability of the joint. The number of oval-shaped portions determines the angle at which the similar axes of ovals are crossing. Thus, with two oval-shaped portions the most favourable angle of crossing is 90°.

The length of oval-shaped portions, the extent of ovality and the thickness of the wall of the cylindrical element are chosen with consideration taken of the properties of material used and the required strength of the joint. Introduction of the resilient cylindrical element shaped as described opens way for more wider use of thermoplastic materials.

The detachable telescopic joint according to the present invention may find many applications and, particularly, broadens the use of thermoplastic materials in mechanical engineering. Very effective, to our opinion, is application of such joints in air cleaners of tractor engines. In this particular case the element made of resilient material functions as a pipe connection of a monocyclone connected to the cylindrical pipe of the second cleaning stage.

To make the essence of the invention more readily understood, specific embodiment thereof will now be described with reference to the accompanying drawings, in which.

Figures 1, 2, 3, 4:
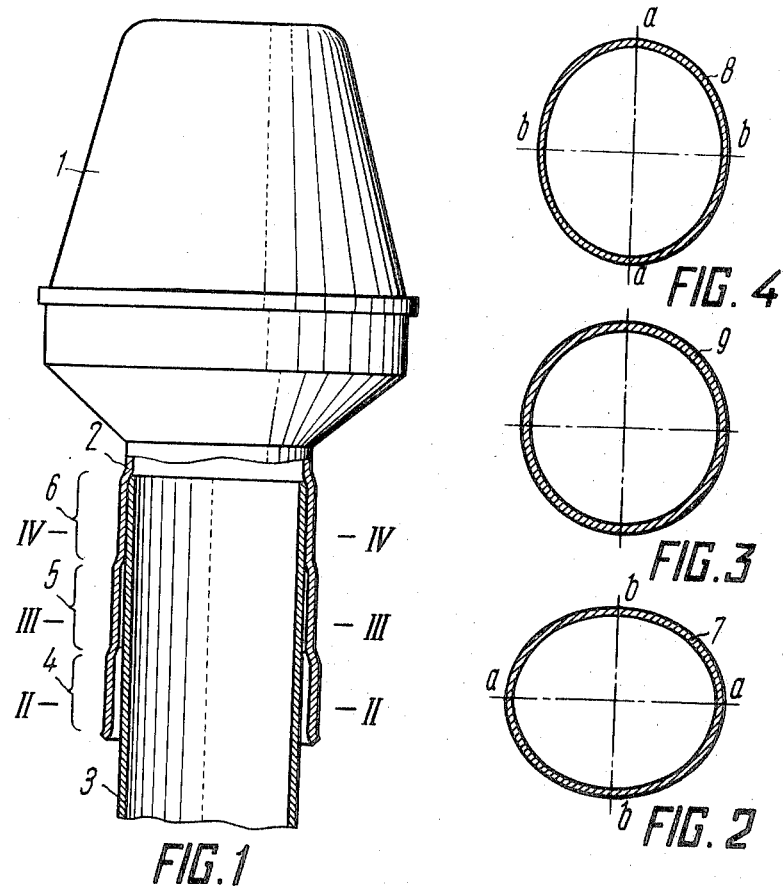
FIG. 1 is a longitudinal sectional view of a tractor engine air cleaner monocyclone connected to a second-stage cleaning pipe.
FIG. 2 is a sectional view taken along the line II—II of FIG. 1.
FIG. 3 is a sectional view taken along the line III—III of FIG. 1.
FIG. 4 is a sectional view taken along the line IV—IV of FIG. 1.

The joint illustrated in the drawing comprises a momocyclone 1 (FIG. 1) having a pipe connection 2 made of material known under tradename "polyethylene", and a cylindrical pipe 3 of the second air cleaning stage. The pipe connection 2 incorporates portions 4,5,6 gradually converting from one into other and being different in their cross-sectional shaping. Portions 4 and 6 present ovals 7,8 (FIGS. 2,4) in their cross-section, while portion 5 presents circle 9 (FIG. 3) in its cross-section. Perimeters of these cross-sections are equal in value. Similar axes ($a$—$a$) and ($b$—$b$) of the ovals are crossing at right angles.

The monocyclone 1 illustrated in the drawing is made of polyethylene and is intended for an engine with a rated air consumption of 300 m³/hr.

The monocyclone 1 through its pipe connection 2, also made of polyethylene, is connected to the steel pipe 3 which is 70 mm in diameter. In this case the dimension of ovals along the short axis is 68.5 mm, along the long axis - 74.5 mm. The length of portions 4,5 and 6 is 25, 20 and 25 mm, respectively. The pipe connection wall is 2.5 mm thick.

In joining the monocyclone 1 with the pipe 3 a certain effort should be applied in the direction of the pipe axis to deform the oval-shaped portions of the pipe connection 2. These deformed portions of the pipe connection 2 ensure reliable joining of the latter with the pipe 3 of second-stage air cleaning. This has been proved by the results of extended service (for more than 5,000 hours) of plastic monocyclones in tractors.

What we claim is:

1. A detachable telescopic joint consisting of two cylindrical telescoping elements with one of them being circular in cross-section and one of the them made of resilient material and having at least three portions gradually converging from one into the other, whereas the middle portion is circular-shaped in its cross-section, while the portions on opposite ends of said middle portion are oval-shaped, and their similar axes are transverse to each other.

* * * * *